United States Patent [19]

Hendricks et al.

[11] Patent Number: 5,313,646
[45] Date of Patent: May 17, 1994

[54] METHOD AND APPARATUS FOR TRANSLUCENT FILE SYSTEM

[75] Inventors: David Hendricks, Menlo Park; Evan Adams, San Leandro; Tom Lyon, Palo Alto; Terrence C. Miller, Menlo Park, all of Calif.

[73] Assignee: Sun Microsystems, Inc., Mountain View, Calif.

[21] Appl. No.: 714,312

[22] Filed: Jun. 10, 1991

Related U.S. Application Data

[63] Continuation of Ser. No. 315,287, Jun. 10, 1989, abandoned.

[51] Int. Cl.$^5$ .............................................. G06F 15/40
[52] U.S. Cl. ................................. 395/600; 395/435; 395/160; 364/DIG. 1; 364/222.81; 364/282.1; 364/283.1; 364/286
[58] Field of Search ................ 395/600, 425, 146, 160

[56] References Cited

U.S. PATENT DOCUMENTS

| | | | |
|---|---|---|---|
| 4,742,450 | 5/1988 | Duvall et al. | 364/200 |
| 4,809,170 | 2/1989 | Leblang et al. | 395/600 |
| 4,875,159 | 10/1989 | Cary et al. | 395/600 |
| 4,887,204 | 12/1989 | Johnson et al. | 395/600 |
| 4,912,637 | 3/1990 | Sheedy et al. | 395/600 |
| 4,914,569 | 4/1990 | Levine et al. | 395/600 |
| 5,001,628 | 3/1991 | Johnson et al. | 395/600 |
| 5,077,658 | 12/1991 | Bendert et al. | 395/600 |
| 5,093,779 | 3/1992 | Sakurai | 395/600 |

OTHER PUBLICATIONS

Hughes, Ronald P., "The Transparent Remote File System," Integrated Solutions, Inc. pp. 306-317.
Gregory, Roger, "XANADU, Hypertext from the Future," S Dr. Dobbs Journal, No. 75, Jan. 1983, pp. 28-35.
Lewis, Brian T., "Experience with a System for Controlling Software Versions in a Distributed Environment," Proceedings of the Symposium on Application and Assessment of Automated Tools for Software Development, IEEE Univ. of Texas, 1983, pp. 1-19.
*Interleaf Technical Publishing Software*, Reference Manual, vol. 1, Sun/Release 3.0, 1986, pp. 15-1-18, 16-1-19.
Kleiman, S. R., "Vnodes: An Architecture for Multiple File System Types in Sun UNIX," Sun Microsystems, pp. 238-247.
Sandberg, Russel, et al., "Design and Implementation of the Sun Network Filesystem," Sun Microsystems, pp. 119-130.
Huskamp, Jeffrey C., "A Modular Operating System for the CRAY-1," Software—Practice and Experience, vol. 16(12), Dec. 1986, pp. 1059-1076.
Tichy, Walter F., "RCS—A System for Version Control," Software—Practice and Experience, vol. 15, No. 7, pp. 637-654, John Wiley & Sons, Ltd., 1985.
McGilton et al., "Introducing the UNIX System," McGraw-Hill, 1983, pp. 75-78.
Andrew S. Tanenbaum, "Operating Systems—Design and Implementation," Prentice-Hall, Inc., 1987, Chapter 5.

*Primary Examiner*—Paul V. Kulik
*Attorney, Agent, or Firm*—Erwin J. Basinski

[57] ABSTRACT

In a computer system having a hierarchical file structure, a file system is provided which permits users of the system to share a file hierarchy and also have a private hierarchy in which files are automatically copied to as they are modified. Through the system of the present invention, a directory appears to the user as a single directory but may actually comprise files originating from a number of directories which are connected to one another through search links. Each directory has a search link associated with it which contains the path name of the back layer or directory behind it. The first layer seen through the system of the present invention is the front layer, private to the user. The back layers behind the front layer and connected to the front layer through the search links are shared layers accessible to multiple users. Thus transparent to the user of the directory accessible comprises multiple layers comprising shared and private files. The system further provides a copy-on-write feature which protects the integrity of the shared files by automatically copying a shared file into the users private layer when the user attempts to modify a shared file in a back layer.

16 Claims, 8 Drawing Sheets

METHOD AND APPARATUS FOR TRANSLUCENT FILE SYSTEM

This is a continuation/divisional of application Ser. No. 07/315,287 filed Feb. 24, 1989 now abandoned.

BACKGROUND OF THE INVENTION

1. Field of the Invention:

The field of the Invention is computer systems utilizing hierarchical file structures, such as the hierarchical file structure used in the UNIX operating system environment.

2. Art Background:

Computer systems available today range in cost and sophistication from low cost micro-processor personal computers to sophisticated, high cost mainframe computers. However, the computer systems can be said to include the same basic components: at least one central processing unit (CPU) which controls the performance of computer operations, input/output units which control the input and output of information within and out of the computer system, and memory or storage space which stores information used by the CPU to perform computer operations.

The CPU is controlled by the operating system which dictates how certain computer operations are to be performed. One portion of the operating system is the file system module which determines and controls the file structure in the computer system.

One type of file structure in use is referred to as a hierarchical file structure. In a hierarchical file structure files are organized into a tree structure commencing with a single root node often referred to as the "root". One or more nodes may then be connected to the root and one or more nodes may be connected to each node. Every non-leaf node of the file system structure, that is a node which has another node connected to it, is a directory of files; and the files at the leaf nodes of the tree are either directories, regular files, or a special type of file such as a device file.

In a particular hierarchical file system, the name of this file is the path name that describes how to locate the file in the system hierarchy. A path name is a sequence of component names separated by the "/" character. A full path name starts with a "/" character which specifies that a file is found by starting at the file system root and traversing the file tree, following the branches that lead to successive paths. For example, the path name /usr/src/cmd/two.c follows a path such as that shown within the box in FIG. 1 and designates the two.c file labeled 5 in the tree shown.

In the software development environment, numerous computer programmers may be working concurrently on a single program or a group of programs which are interrelated and operate together. It is quite desirable that the work be done simultaneously so that it may be completed in the shortest amount of time. Typically, each software programmer makes a copy of those files in the portion of the file structure he is working in and works on those particular copies to achieve his goal. Thus, if a product consists of twenty programs, each programmer may have a copy of those twenty programs in his user area.

The problem with this arrangement is that each programmer must usually work with a large number of files in order to work on a single file. Consequently, multiple copies of these files exist in numerous places on the system, requiring a large amount of disk memory space and adding to the complexity of the arrangement and the identification of the files. Furthermore, it is quite easy to lose track of or confuse older versions of programs with the current versions of programs. For example, programmer one may be working on certain portions of a program that has a revision date of may, and programmer two may be working on a program that has a revision date of June. Thus the changes made by either programmer are contained in different versions; and, in order to incorporate the new software developed by the programmers, the code must be incorporated into the latest version of the code, a repetitive and cumbersome task.

SUMMARY OF THE INVENTION

It is, therefore, an object of the present invention to provide a computer system which contains a file structure and system comprising a private file hierarchy and a shared file hierarchy, the private hierarchy containing those files which only the private user has modified.

It is further an object of the present invention to provide a computer system in which shared files are written into a private user file automatically if the user attempts to modify the file.

It is another object of the present invention to provide a computer system in which files may be accessed by a common name regardless of the location of the file in the file structure.

It is an additional object of the present invention to provide a computer system in which a file directory contains both shared and private files.

In the computer system of the present invention, the operating system comprises a translucent file system module (TFS) which permits users of the computer system to share a file hierarchy and also to have a private file hierarchy in which files from the shared hierarchy are copied into the private hierarchy only as they are modified, a feature referred to as a "copy-on-write" procedure. Writing is done only in the private hierarchy. Thus, individual users are isolated from changes made by others because files in the shared hierarchy are guaranteed not to change. In addition, files are only copied when they are modified; until modified, the shared files are utilized. Consequently, a significant amount of disk space is conserved.

A directory seen through the TFS appears to the user as a single directory, but actually comprises listings for files or directories which may exist in a number of layers. Each layer is a physical directory, and the layers are joined by what are referred to as search links. Each layer has a search link associated with it which contains the directory name of the next layer behind it. The first layer seen through the TFS is considered to be the front layer, and layers found by following the search links from this layer are considered to be behind the front layer in what are referred to as the "back layers". The files show through from back layers unless the same files exist in a layer in front to mask the files in the back layers. Therefore, it can be said that the front layer is translucent or selectively transparent

BRIEF DESCRIPTION OF THE DRAWINGS

The objects, features and advantages of the system of the present invention will be apparent from the following description in which.

DETAILED DESCRIPTION OF THE INVENTION

In the system of the present invention, a file system is provided comprising a Translucent File System module (TFS), which provides users with a shared file hierarchy and a private hierarchy in which shared files edited by the user are automatically copied into the user's private hierarchy. By means of the TFS module, search links are formed for each directory. The search link for a directory comprises a pointer stored in the layer with a directory which points to the next directory which is in the next layer behind the directory. Therefore, files can be accessed from directories or layers which are behind the front layer by examining the layer identified through the search links.

The physical layers may be located in one location of memory or storage on one computer system or at multiple locations situated on multiple computer systems linked together through a computer network. Whenever a user or a process accesses a file, the TFS module causes the most current version of the file to be presented for access. Furthermore, if a user requests a directory listing, the TFS module causes a directory listing to be displayed, listing only the most current versions of the files found among the directories linked together through search links. The files listed may be shared files located in different back layers or the files may be private files, private to the user and located in the front layer.

One operating system which uses a hierarchical file structure is the UNIX ® (UNIX is a registered trademark of AT&T) operating system initially developed by Bell Laboratories. Although the preferred embodiment is described in a UNIX operating system environment, it is evident that the system of the present invention may be applied to other operating systems employing a hierarchical file structure.

In a UNIX-based system, the operating system interacts directly with the hardware providing common services to programs and isolating the software and users from the hardware idiosyncrasies of a particular computer system. Viewing the system as a set of layers, the operating system is commonly called the "system kernel" or just "kernel", emphasizing its isolation from the user programs. Because the programs are independent of the underlying hardware, it is easy to move the programs between UNIX systems running on different hardware. The UNIX file system, located within the kernel, organizes the file structures.

Figure 1:
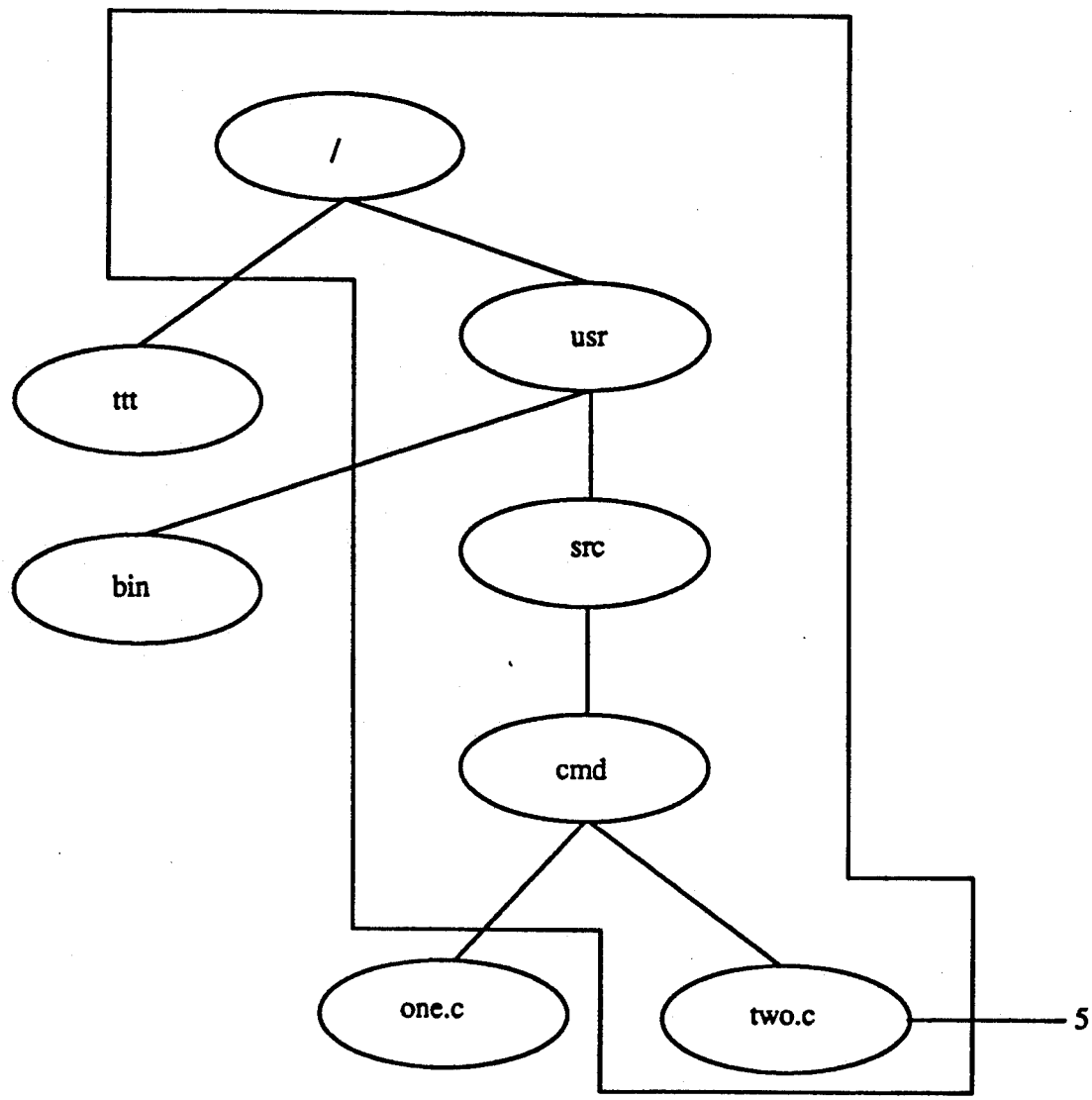
FIG. 1 illustrates a hierarchical file system structure.
Figure 2:
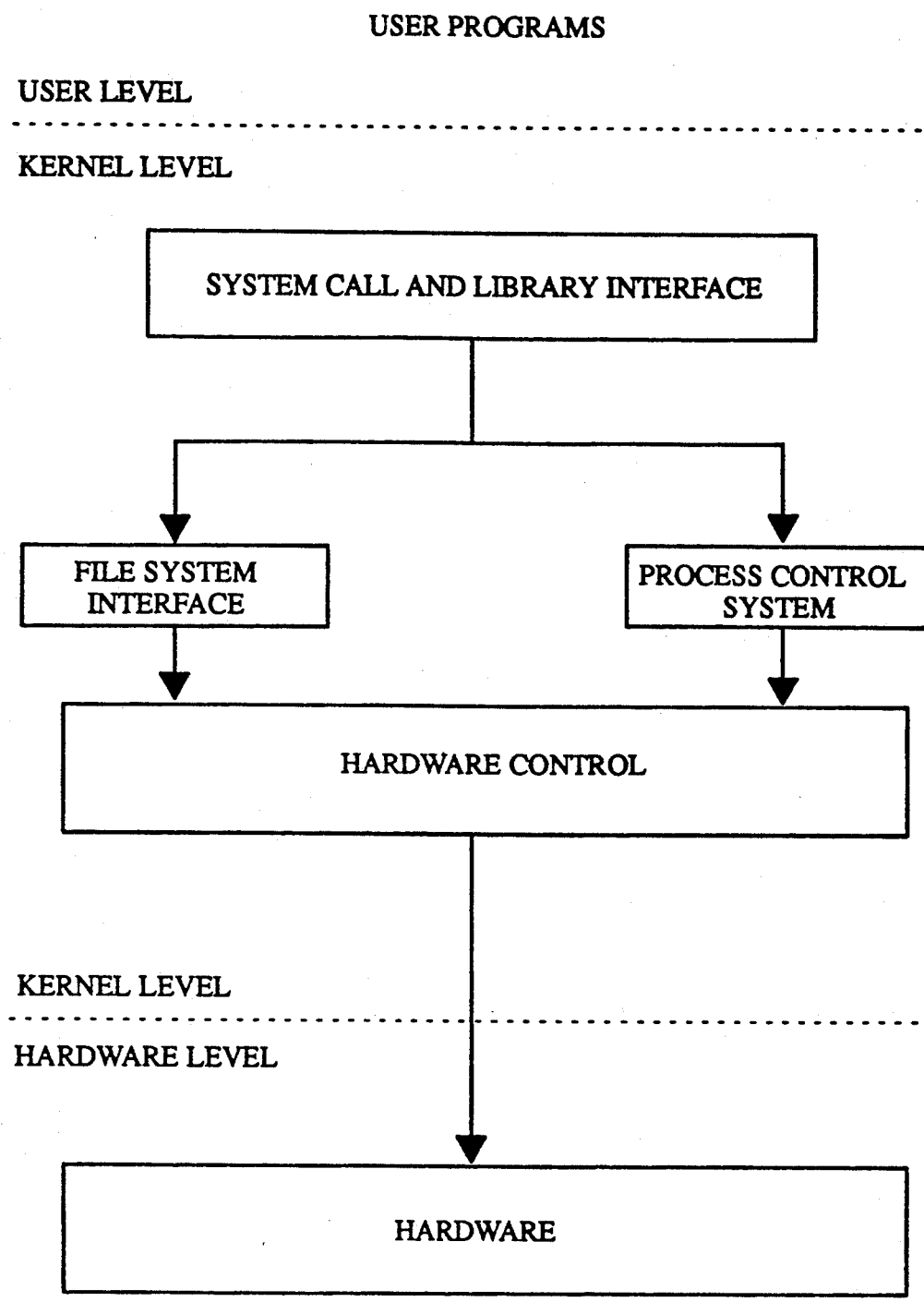
FIG. 2 is a block diagram representation of a UNIX-based computer system.

The kernel is depicted generally in FIG. 2 which shows three levels: user/programs, kernel and hardware. The system call and library interface represents the border or interface between programs and the kernel. The system calls are divided into those system calls that interface with the file system and those that interact with the process control system. The process control system is responsible for process synchronization, interprocess communication, memory management and process scheduling. The file system manages files, allocates files space, administers free space, controls access to files and retrieves data for users and programs.

Figure 3A:
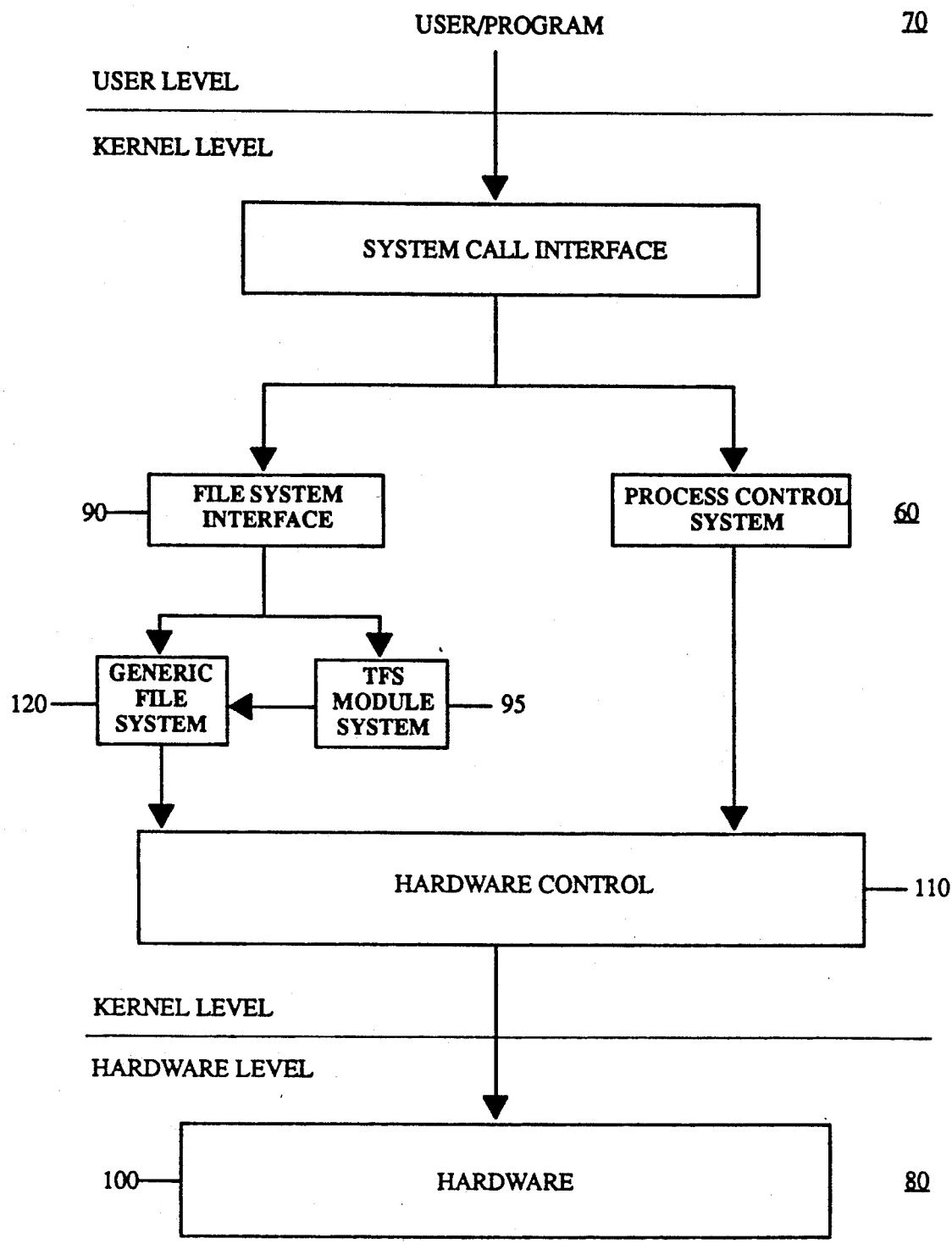
FIG. 3(a) is a block diagram illustrative of the location of the TFS module system in one embodiment of the system of the present invention.

One embodiment of the system of the present invention is realized in the system illustrated in FIG. 3(a). The kernel 60 interfaces to the user/programs at the user level 70 and the hardware at the hardware level 80. The file system comprises a file system interface 90 which receives the file system commands and determines whether the current directory to be accessed is a TFS directory. This is preferably achieved by storing a table or file accessible by the file system interface 90, which identifies those directories or file systems which are to be accessed through the TFS module.

One UNIX-based system is the SUNOS (Sun Operating System), produced by Sun Microsystems, Inc., Mountain View, Calif. This operating system includes in its most recent versions, a Network File System (hereinafter NFS). The NFS is further described in a paper entitled *Design and Implementation of the Sun Network File System*, Sandberg et al, published by Sun Microsystems Inc. Associated with the NFS is a Virtual File System (hereinafter VFS). The VFS is a file interface architecture for accommodating multiple file systems within the SUNOS kernel. In particular, the VFS provides a file system interface which supports local disk file systems such as the 4.2BSD file system, stateless remote file systems such as NFS, statefull remote file systems such as AT&T's RFS, or non-UNIX file systems such as MSDOS. The VFS is further described in a paper entitled *Vnodes: An Architecture for Multiple File System Types in Sun UNIX*, S. R. Kleinman, published by Sun Microsystems, Inc.

The VFS allows the mounting of different file systems which require different mount data. To accomplish this, in using the system mount command, the file system type, the directory which is the mount point, the directory to be mounted, various generic flags such as "read only," and a pointer to the file system specific type data are provided. The mount system command accepts as one of its file system types the designation TFS.

Thus, the file system may be identified to be a "TFS type" by the user when the directory or file system is mounted. The "mount" command attaches a named file system to a file system hierarchy which is identified by a path name location (e.g. "/usr/src"). For example, if a first file system "/aaa/bbb/ccc" is mounted on a second file system "/usr/src" the resulting file system consists of "/usr/src/aaa/bbb/ccc". This pathname for the file system to be attached is the pathname which designates the frontmost writable directory in the TFS system.

If the current directory is a TFS directory, then any directory command to be executed is executed through the TFS module 95. Otherwise the command is executed by the non-TFS module, hereinafter referred to as the "generic file system module" 120. If the command is to be executed through the TFS module system 95, the TFS module under control of a TFS server process (a user program) makes requests through the generic file system module 120 which provides the proper commands to the hardware control system 110 for causing the hardware 100 to execute the commands. The TFS module system 95, upon receipt of a command, such as one for reading a file or for providing a listing of the directory, utilizes the search links from the designated directory and other features particular to the TFS file system in order to access the most current version of the file or files that may be located in the multiple layers in the file system.

Figure 3B:
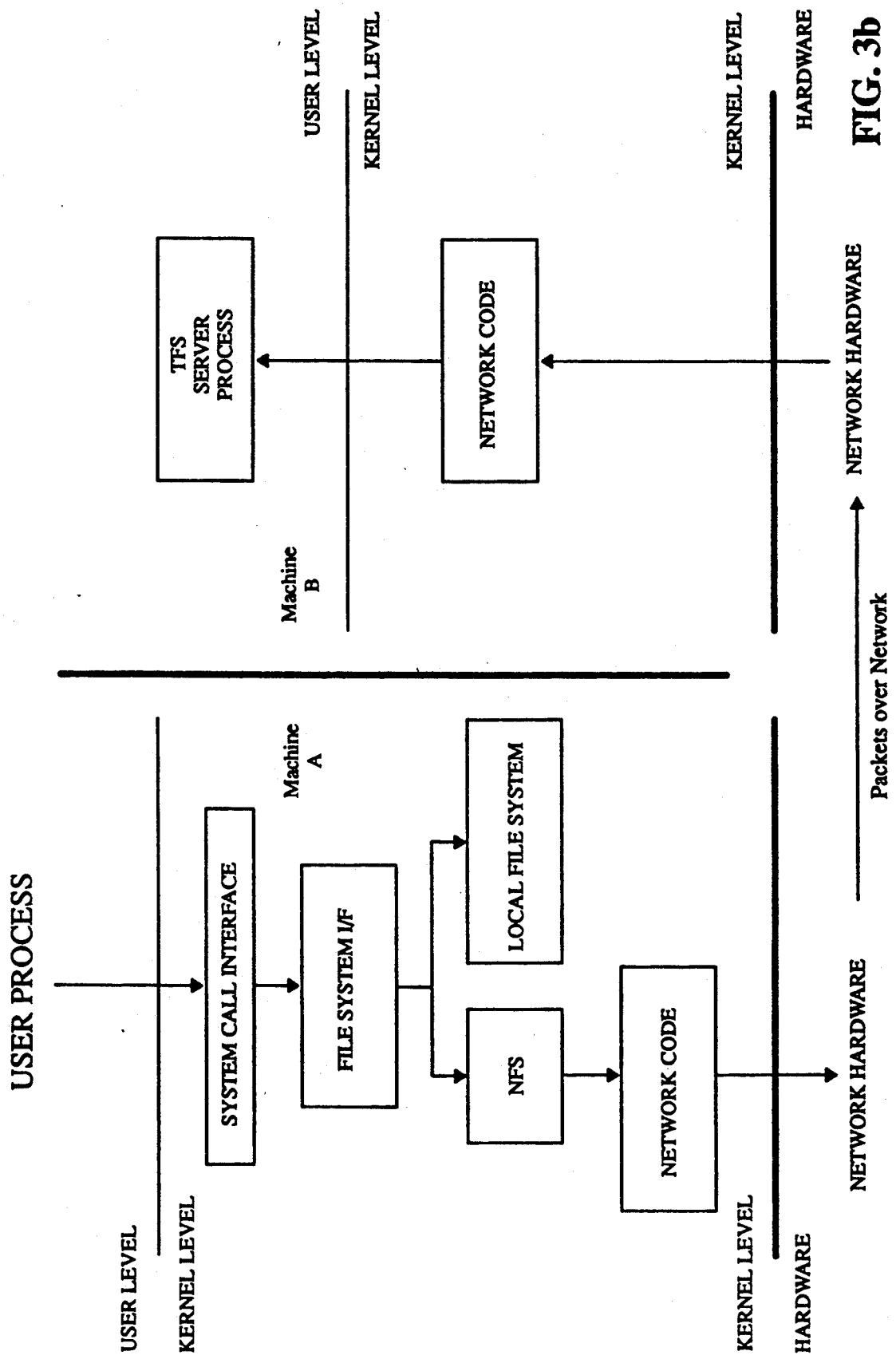
FIG. 3(b) is a block diagram illustrative of the location of the TFS module system in another embodiment of the system of the present invention.

A second embodiment of the invention which minimizes the modifications to the kernel is shown in FIG. 3(b). In this embodiment, the TFS file system module is connected through a pre-existing file system module such as the Network File System Module (NFS) which is connected to the file system interface as a server. The NFS module directs the command to the NFS server that is bound to, and for the purposes of TFS, the TFS module is the file server. Therefore, the system commands are directed to the TFS module. Since the commands for operating the NFS module are already in the kernel, when the TFS acts as an NFS server the kernel does not have to be modified. Thus, commands relevant to a TFS file system are first directed to the NFS module where they are forwarded to be executed through the TFS module. The TFS module then provides the layer directories in the manner described.

In either embodiment of the invention, the user has a single private front layer. The name of the directory for the front layer is specified at mount time and sent to the TFS server process. The TFS server process then follows the search links from the designated front layer to determine the rest of the layers. The searchlinks are originally established by software commands "acquire" and "preserve" in the Network Software Environment, utilities that run on the SUNOS; obviously, other commands might be used in other systems. These commands are used when a file is first viewed by a user and point to the next back layer.

As explained, in the preferred embodiment the search links for a file system are in a file associated with a directory and identify the next back directory for the layer in back of a particular directory. In effect, a directory is designated as lying in a back layer by the search links pointing to it. When the search links are established, the files in that back directory are designated as read-only by the TFS server process. Although it is preferred that the search link for each directory be located in a file associated with that directory, the search links for the entire file system might be located in a single file situated in a central location such as the root directory of the file system. The search links identify the directories of shared files located in the back layers. The files are designated "shared" simply because of the search links which have been established.

When a TFS module receives a command to be executed, such as "list a particular file", the TFS directory identified in the command, which by default is the front layer, is examined first to determine if the file requested is located in the front layer. If the file is not located in the front layer, the TFS module reads the file containing the search link and examines the files in the directory identified in the search link. This process continues until the last directory identified through search links is read or until the file is found. If the file requested is found, it is identified to the user in the same manner as if it was located in the user's current directory, i.e. the front layer, even though the file may be located on a back layer numerous layers behind the front layer. This entire operation of searching multiple layers or directories is transparent to the user.

Figure 4A:
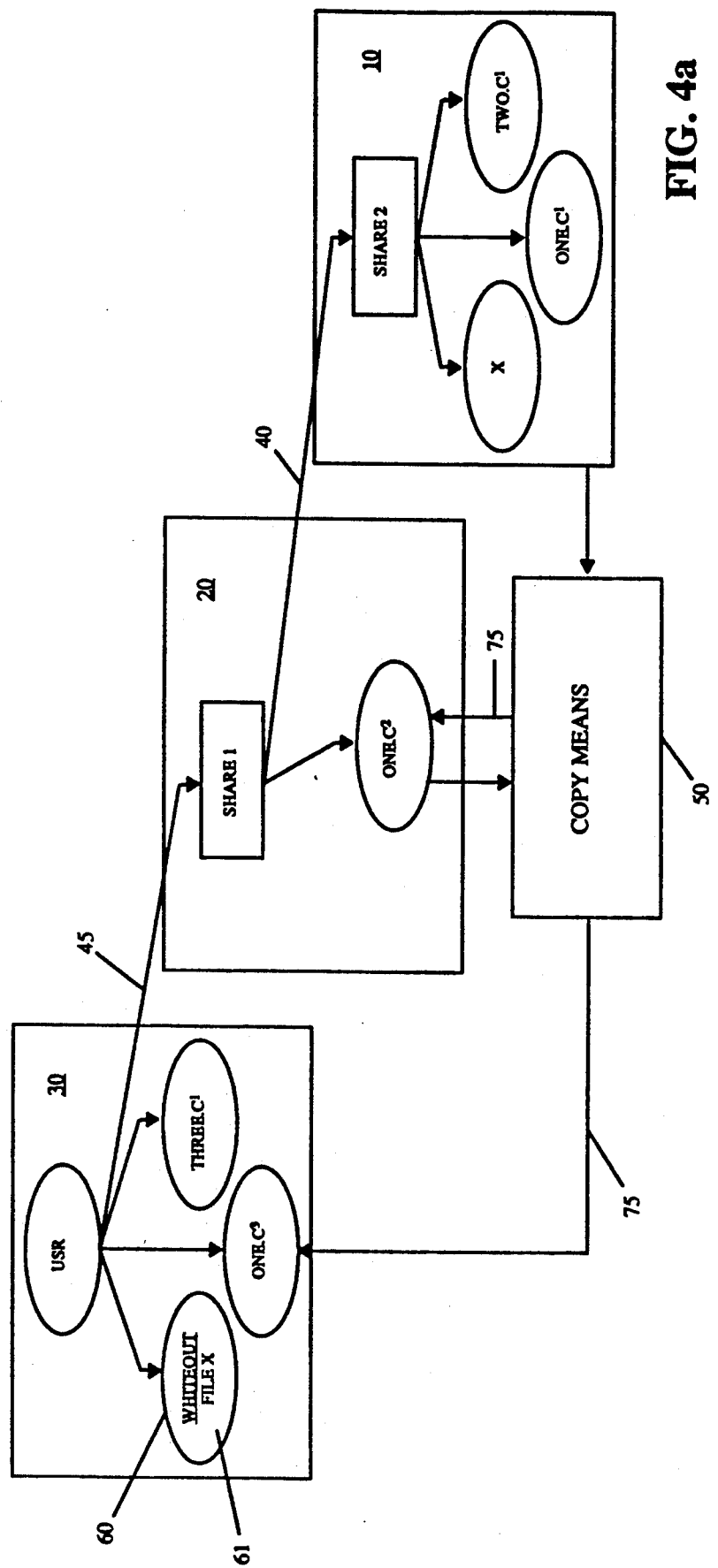
FIG. 4(a) and 4(b) illustrates a hierarchical file system and the resulting structure visible to the user through the system of the present invention.
Figure 4B:
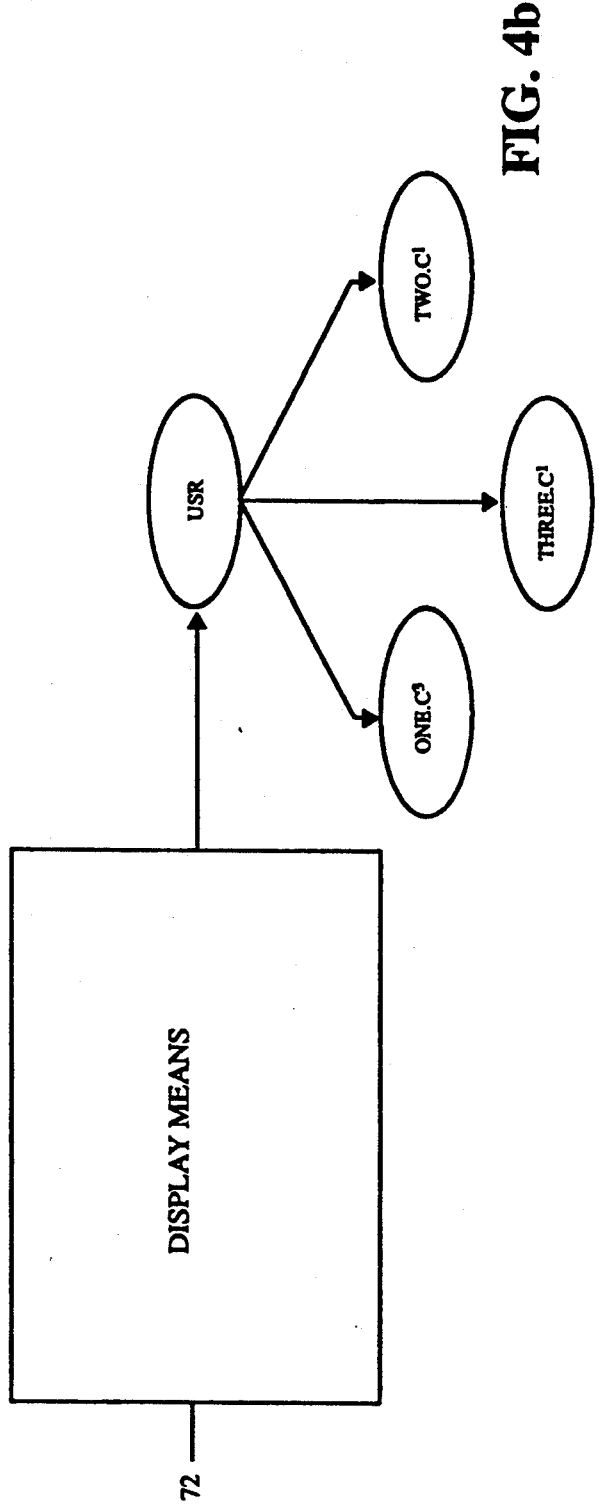

FIG. 4 illustrates three layers 10, 20 and 30 connected by search links 40 and 45 containing different versions of files one.c, two.c, and three.c. Layer 30 is the private layer and contains files one.$c^3$ and three.$c^1$ indicating the most current version with respect to the user of those files, and a white-out marker 60 indicating that file X 61 is deleted for this user. The files one.$c^3$ and two.$c^1$ are private files signifying that the user had either created the files or had modified the shared versions of the files. The layer directly behind the private layer 30, is layer 20. This is a shared layer and contains the file one.$c^2$, an earlier version of one.$c^3$. File one.$c^2$, was copied automatically 75 via copying means 50 into layer 30 when the user modified or wrote on the file. Connected by search link 40 is shared layer 10 which is behind layer 20. Shared layer 10 contains files one.$c^1$ which is an earlier version of one.$c^2$, file X and file two.$c^1$. Using the TFS module of the present invention, the resulting file structure, that is the file structure visible to and accessible by the user is a single directory, a single layer containing files one.$c^3$, two.$c^1$ and three.$c^1$. This is illustrated in FIG. 4(b) in which the files one.$c^3$ and three.$c^1$ originated from the private layer 30 and file two.$c^1$ originated from the shared back layer 10 are displayed to the user via display means 72. Thus, it can be seen that the complexities of multiple layers are isolated from the user of the system. Furthermore, the shared files located in the back layers are protected from modification by a user by the copy-on-write feature which automatically copies a file into the user's private front layer when the user attempts to modify the file.

Because the back layers are read only and the private layer is the only layer which is read and write accessible, files may only be deleted from the private layer. However, if the user has no need for certain files that are located in back layers, the user can effectively delete those files through a "white out" function. The white-out function causes a file which would otherwise be displayed when a user reviews his directory, to be masked-out and not visible or accessible to the user. A file is provided in which the white-out entries are listed. The file is referred to by the TFS module to determine whether a particular file is to be masked or "whited out" when file system operations are performed. The white out entries for a file system may be stored in a single file in the root directory of the file system. Alternatively, the file containing the white-out entries for a directory may be stored in each directory or the white-out entries may be incorporated into the same file containing the search link. In a preferred embodiment, commands may be included for listing the files subject to the whiteout command and for removing the white-out indication for a particular file.

In another embodiment of the system of the present invention, conditional search links are provided. A conditional search link can point to more than one directory, wherein the directory pointed to is dependent on the variant used. To accomplish this result, each search link provides a string of characters which indicate that there are variants of the search link. In use, the TFS module determines which variant to use from the file system designation given at the mount command, and the string is replaced by the TFS module with a proper variant name to read the proper search link to yield the name of the next back layer.

These conditional search links are particularly helpful where numerous identical source files are used for different versions of operating systems since each version is then capable of compiling its own object code from the same source code.

Figure 5:
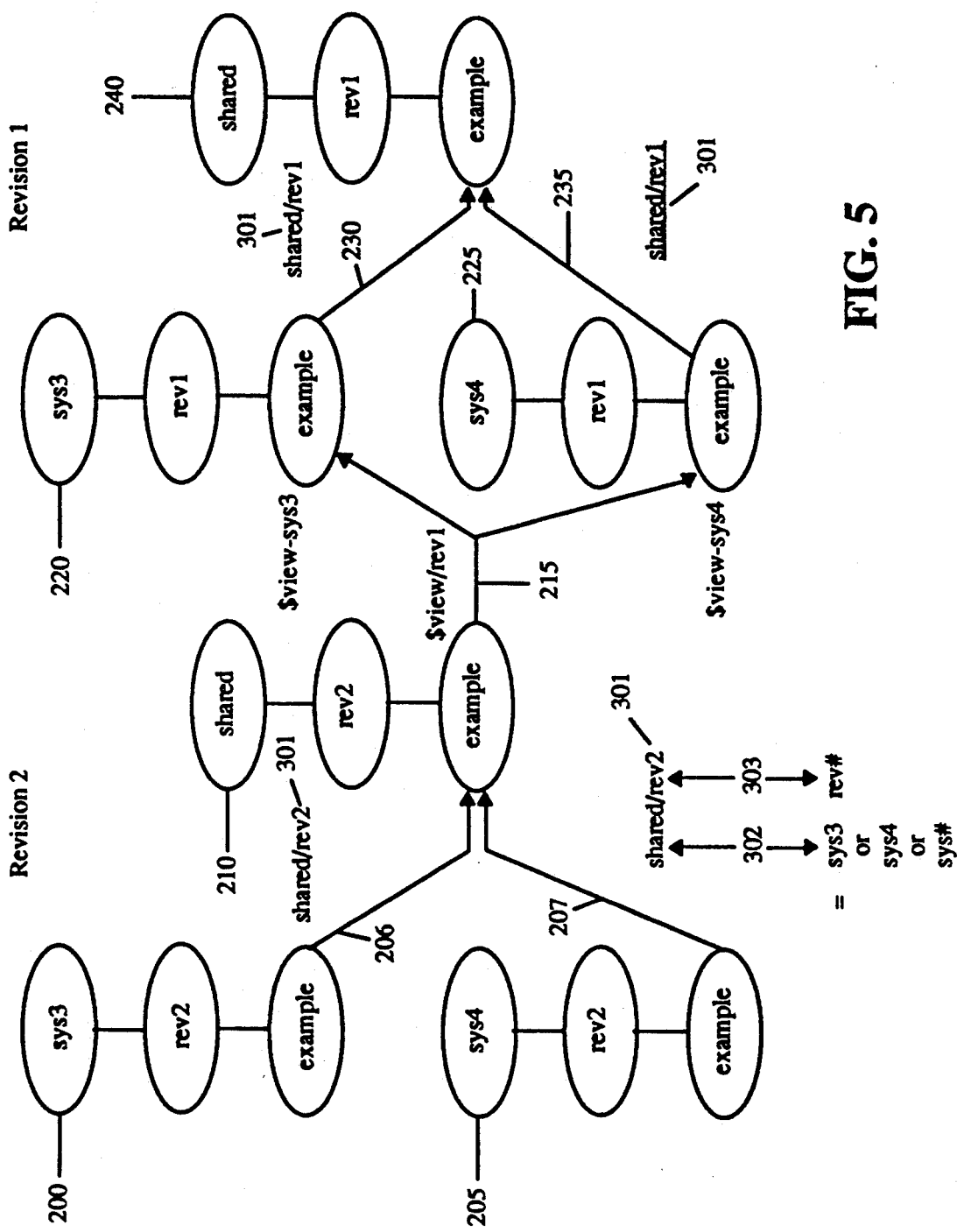
FIG. 5 illustrates a hierarchical file system employed using an embodiment of the system of the present invention including shared layers and variant layers.

Referring to FIG. 5, there two variants, sys3 and sys4 which are used on two separate hardware architectures. There are two revisions, revision 1 and 2; and each revision has a variant layer for each of the sys3 and sys4 variants and a layer 210 shared between the two variants. The sys3 and sys4 variants both have layers in revision two 200, 205 with search links to the shared layer for revision two 210. These search links 206, 207 have the form "shared/rev#" 301 for accessing each variant. The "shared" portion 302 is used to identify the "system Number" and the "rev#" portion 303 identifies the revision variant portion of the access link. The shared layer 210 has a conditional search link 215 to $view Rev1. In the preferred embodiment, the "$view" is the indication used for a conditional search link. When the user looks at the sys3 variant this conditional search link points to the sys3 revision one layer 220 and if the user looks at the sys4 variant the search link points to the sys4 revision one layer 225. The sys3 and sys4 revision one layers 220, 225 have regular, that is, unconditional search links 230, 235 to the shared layer for revision one 240. The conditional search links and the shared layers allow files to be shared by different variants so that the source files in the shared layer will be seen in both sys3 and sys4 variants.

Figure 6:
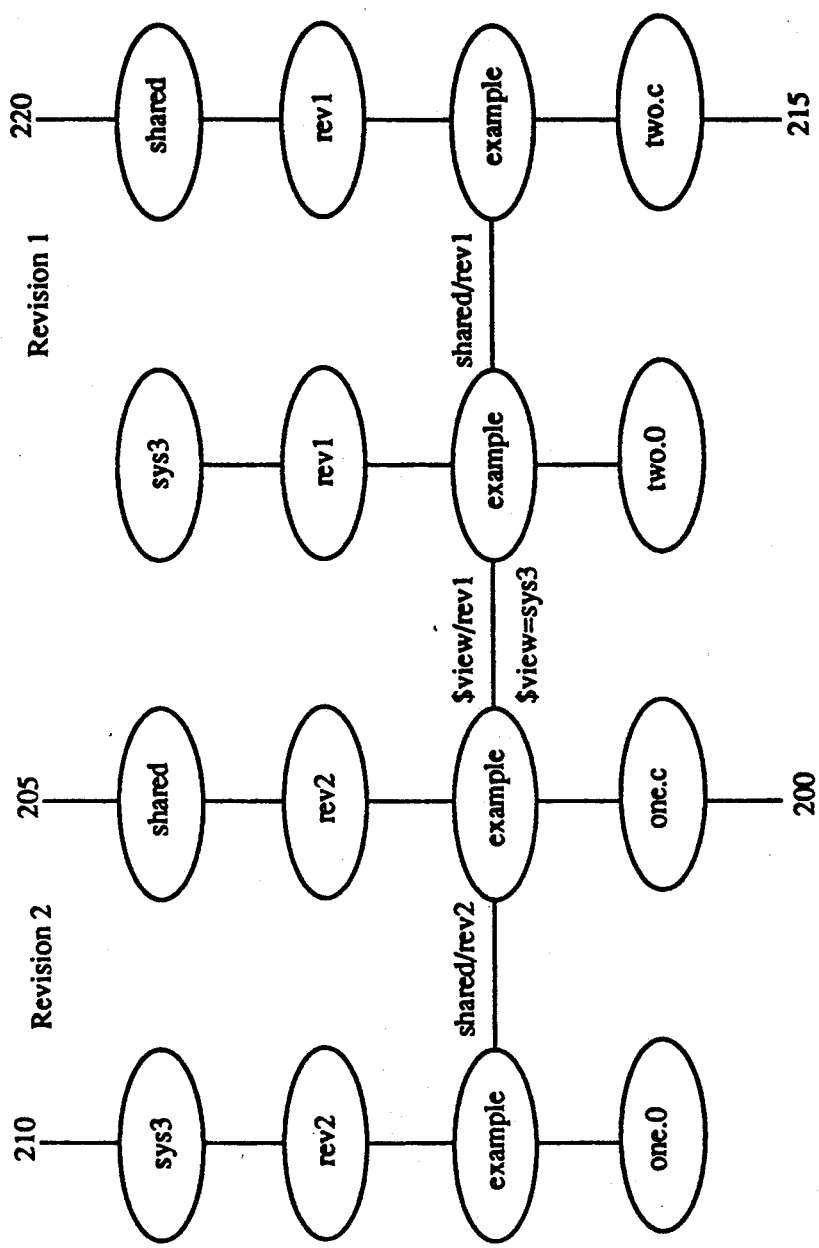
FIG. 6 further illustrates the embodiment of the system of the present invention described with respect to FIG. 4.

Additionally, protection is provided to prevent a user operating in one variant from modifying a source file from a shared layer such that the file is copied to the front layer which is variant specific. If this occurs, the source file is no-longer shared because the most current version of the source file is in a user's front layer which is variant specific and is no longer in the layer shared among the variants. It is therefore preferable that the most current version of the source files stay in the shared layer even when it is modified. This feature is achieved by providing a front layer comprising sub-layers: a shared sub-layer and a sub-layer for each variant. Thus, any modification performed with respect to a shared or variant sub-layer is maintained in the particular sub-layer. If a file is found in either of the two front sub-layers, the file will be modified in that sub-layer. This is illustrated in FIG. 6. If file one.c in the revision two shared layer 205, which is the front layer, is modified by a user who is operating under the sys3 variant, the file will not be copied to the revision two variant sub-layer 210; instead the file will remain in the revision two shared sub-layer 205. Furthermore, when a file is created, it is created in the front variant sub-layer unless the file name has appeared in the shared sub-layer whereby the file is created in the front shared sub-layer. The preservation of the sub-layers also applies to the copy on write function of back layers as well; if a file to be modified is found in the shared sub-layer of a back layer that file will be copied to the shared sub-layer of the front layer. If a file to be modified is found in a variant sub-layer, it will be copied to the variant sub-layer of the front layer.

For example, referring to FIG. 6, if the file two.c 215 in the revision one shared layer 220 is modified, it is copied to the shared sub-layer of revision two 205. However, if the file two.0 is modified, it is copied to the variant sub-layer of revision two 210. Thus, only one front writable layer exists, but the layer comprises multiple sub-layers reflecting shared variant sub-layers.

One problem with the invention disclosed to this point is that as the number of back layers increase, so do the number of search links and the amount of time to perform a file system function such as listing the contents of the directory which requires reading numerous directories and search link files until the last back layer is reached. Consequently, in another embodiment of the system of the present invention, a file look-up cache, referred to as a "back file", is utilized to accelerate file look-up and directory read functions.

To minimize the amount of time and the number of operations required to perform operations with respect to a multi-layered file system, back files are used. The back file for a directory contains a list of all the read-only files in the file system and the path names of the back layers the files are found in. Thus, to read a directory, the TFS system needs only to read the directory entries of the front layer and the back file for that directory located in the front layer to determine the names and the actual locations of the files in a file system. Furthermore, a file located in a back layer can be directly accessed simply by determining the location through the back file. The back file is always accurate because the back layers are read only; that is, the files in the back layer cannot change so once a file is placed in a back layer, it remains in the back layer.

The back files are written by the TFS process server when a user looks up a file in a TFS directory or reads a TFS directory; if at that time no back file exist for the directory, one is created. Normally, this is a simple process because there is usually a back file for the directory of the next layer back which can be used to construct the new back file for the front layer. Thus, usually only the first read-only layer has to be read for its contents since the locations of the rest of the read-only files can be determined from the back file in the first read-only layer.

While the invention has been described in conjunction with preferred embodiments, it is evident that numerous alternatives, modifications, variations and uses will be apparent to those skilled in the art in light of the foregoing description.

We claim:

1. In a multi-user computer system comprising a central processing unit (CPU), an input/output unit and memory, said CPU being controlled by an operating system, said operating system comprising a file system module, wherein the file system module organizes and controls access to files located on disks in the computer system, said file system module organizing files into file systems comprising directories said directories containing files organized in a hierarchical file structure, a method for translucently providing to a user both shared and private access to current revisions of files, said method comprising the steps of:

structuring a designated file hierarchy into two or more layers whereby each layer contains at least one directory;

creating an ordered set of layers which can be shared by any number of users, wherein two or more layers of the designated file hierarchy are arranged in time-of-creation sequence such that a layer containing a less recent revision of a file in the designated file hierarchy is placed below a layer with a more recent revision of the same file;

providing one or more front layers, each containing at least one directory, with each of the one or more front layers being controlled by a particular user of the system and is not being shared with other users of the system, with files located in each of said one or more front layers being designated such that only the particular user can read from and write to the files in said particular user's front layer, and each front layer being positioned in front of the ordered set of shared layers of the designated file hierarchy;

displaying to a particular user, most recent revisions of files regardless of whether these files reside in the directory of the particular user's front layer or in the directories of the ordered set of shared layers, as if all of the files resided in the particular user's front directory.

2. The method of claim 1 wherein the step of creating an ordered set of shared layers further comprises a first connecting step for connecting a particular layer in the ordered set of shared layers to a layer below said particular layer by means of search links, and wherein the step for providing one or more front layers further comprises a second connecting step for connecting each of the one or more front layers to a topmost layer of the ordered set of shared layers using search links, wherein the search links are associated with a directory of each layer and comprise a path name of a directory of a layer behind the layer the search link is located in, said path name identifying the location of a directory in a file system.

3. The method of claim 1 further comprising steps for automatically copying a designated file from a layer of the ordered set of shared layers, into a particular user's front layer when the particular user attempts to execute a write command to the designated file, whereby the copy of the designated file in the particular user's front layer can be modified according to the write command which triggered the copy operation without the copy operation or the location of the modified copy of the designated file being evident to the particular user.

4. The method of claim 2 wherein the step of connecting the one or more front layers and the ordered set of shared layers through search links comprises an additional step of establishing such search links when a new layer is created.

5. In a multi-user computer system comprising a central processing unit (CPU), an input/output unit and memory, said CPU being controlled by an operating system, said operating system comprising a file system module, wherein the file system module organizes and controls access to files located on disks in the computer system, said file system module organizing files into file systems comprising directories and files organized in a hierarchical file structure, said directories containing the files, a translucent file system module which cooperates with the file system module, said translucent file system module comprising:

organizing means for structuring a designated file hierarchy into two or more layers whereby each layer contains at least one directory;

ordering means for creating an ordered set of layers which can be shared by any number of users, wherein the two or more layers of the designated file hierarchy are arranged in time-of-creation sequence such that a layer containing a less recent revision of a file in the designated file hierarchy is placed below a layer with a more recent revision of the same file;

a first layering means for providing one or more front layers, each containing at least one directory, with each of the one or more front layers being controlled by a particular user of the system and not being shared with other users of the system, with files located in each of said one or more front layers being designated such that only the particular user can read from and write to the files in the particular user's front layer and each particular user's front layer being positioned in front of the ordered set of shared layers of the designated file hierarchy; and display means for displaying to a particular user, most recent revisions of files regardless of whether these files reside in the directory of the particular user's front layer or in the directories of the ordered set of shared layers, as if all of the files resided in the particular user's front directory.

6. The translucent file system module of claim 5 wherein the ordering means for creating an ordered set of shared layers further comprises a connecting means for connecting a particular layer in the ordered set of shared layers to a layer below said particular layer by means of search links, and for connecting each of the one or more front layers to a topmost layer of the ordered set of shared layers using search links, wherein the search links are located in a directory of each layer, and comprise a path name of a directory of a layer behind the layer the search link file is located in, said path name identifying a location of a directory in the translucent file system.

7. The translucent file system module of claim 5 further comprising copying means for automatically copying a designated file from a layer of the ordered set of shared layers, into a particular user's front layer when the particular user attempts to execute a write command to the designated file, whereby the copy of the designated file in the particular user's front layer can be modified according to the write command which triggered the copy operation without the copy operation or the location of the modified copy of the designated file being evident to the particular user.

8. The translucent file system module of claim 6 wherein the means for connecting each of the one or more front layers and the ordered set of shared layers through search links comprises a means establishing such search links when a new layer is created.

9. The translucent file system module of claim 5 further comprising routing means to direct any file system commands from the file system module with respect to the designated file hierarchy to the translucent file system module such that the commands are executed through the translucent file system module.

10. The translucent file system module of claim 5 further comprising designating means for identifying directories according to a type of variant of files contained in the directories; and accessing means for accessing files located in the at least one directory of the one or more front layers and in the ordered set of shared layers, comprising identification means for identifying the type of variant of files to be accessed, wherein the particular user is provided access through the particular user's front layer directory to files located in directories identified by a variant type requested by the particular user.

11. The translucent file system module of claim 10 wherein a search link file is located in the at least one directory of each layer, said search link file comprising a variant type name which identifies a variant type of files contained in a directory located in a next lower layer and a path name identifying a location of a directory located in a next lower layer which contains files of a desired variant type.

12. The translucent file system module of claim 11 wherein the accessing means for accessing the particular user's front layer and the ordered set of shared layers further comprises means directing any file system commands from the file system module with respect to the designated file hierarchy to the translucent file system module such that the commands are executed through the translucent file system module.

13. The translucent file system module of claim 12 wherein each of the one or more front layers comprise at least a first and a second sub-layer, the first sub-layer comprising a directory containing those files which are not identified by a variant type and the second sub-layer comprising a directory containing those files identified by a variant type.

14. The translucent file system module of claim 13 further comprising copying means for automatically copying a selected file located in a layer of the ordered set of shared layers into a particular user's front layer when the particular user attempts to write the selected file, and for copying selected files which are not identified by a variant type into a directory of the sub-layer which is not identified by a variant type and for copying files which are identified by a variant type into a directory of the sub-layer identified by the variant type.

15. The translucent file system module of claim 5 wherein the file system module is distributed among a plurality of computer systems connected together via a computer network such that different portions of the file system are located on different computer systems connected together via the computer network.

16. The translucent file system module of claim 5 further comprising masking means to eliminate access to an unwanted file located in a layer of the ordered set of shared layers without deleting the unwanted file such that the unwanted file may be accessed by others sharing the ordered set of shared layers, said masking means comprising:

marking means for establishing a white-out file in a particular user's front layer identifying unwanted files in a layer of the ordered set of shared layers to which access by the particular user will no longer be permitted from the particular user's front layer; and reading means for reading the white-out file and masking out any unwanted file listed in the white-out file when any operation is performed involving the file system such that a masked unwanted file is invisible to the particular user of the system when viewed from the layer containing the white-out file or from any layer above a layer containing the white-out file.

* * * * *